Patented Oct. 9, 1951

2,570,990

UNITED STATES PATENT OFFICE 2,570,990

FUEL COMPOSITIONS AND THEIR PREPARATION

John A. Southern and Lloyd J. Roth, United States Army, Francis J. Licata, West Caldwell, N. J., and Joseph Cunder, United States Army, assignors to the United States of America as represented by the Secretary of War No Drawing. Application April 26, 1944, Serial No. 532,874

3 Claims. (Cl. 44—7)

The invention described herein may be manufactured and used by or for the Government, for governmental purposes, without the payment to us of any royalty thereon.

This invention relates to gelled incendiary oils useful as fillings for incendiary bombs, grenades, flame throwers, and the like.

In particular, it is concerned with providing a soap-type gelling agent simple in composition, easy to manufacture from available materials, reproducible, and advantageously able to form stable gels with volatile carbonaceous fuels at ordinary temperatures.

Solidified oils have been of interest a long time for commercial applications, but certain gelled liquid fuels more recently developed are especially useful in the art of military incendiaries.

Extensive research and field tests have established a number of exacting requirements for military incendiary gels formed from gel-producing soaps with gasoline, benzene, naphthas, petroleum ether and similar fuels containing volatile ingredients with or without other relatively less volatile ingredients. They must be stable at temperatures varying from about −40° to +65° C. so that they may be used in frigid or tropical climates. Under storage conditions they should not break down with loss in viscosity or by syneresis. They should have inner cohesion to prevent scattering by explosion or impact. They should adhere to a target sufficiently to set it on fire and not bounce from the target. They should be capable of easy ignition even at subzero temperatures. They should have extensibility or string of at least 1½ inches. They should have viscosity of about 1,000 to 4,000 stokes.

In addition, it is very desirable and often important that the soap gelling agent be capable of forming a gel which ages at ordinary temperatures upon admixture with a liquid fuel, not only to facilitate the gel preparation generally, but also to permit certain munitions to be charged with the soap and fuel separately and have the gel set within the munition without application of heat. By having a gel form and age without application of heat, it is possible to supply the soap and fuel separately for preparation of the gel in the field expeditiously. Also, by eliminating the need of heat for aging, the gel may be prepared without difficulty in preventing the loss of volatile fuel components.

To date, gelling agents most suitable for meeting the requirements of the gelled oil incendiaries have been inadequate, since some of their ingredients are strategic materials unavailable for quantity production and some unavailable domestically, as, for example, naphthenic acids and coconut oil acids. Moreover, these soap-type gelling agents have certain technological drawbacks, since the initial materials, such as coconut oil and naphthenic acids, contain too many variables for ready reproducibility and control. Coconut oil acids comprise at least nine different saturated fatty acids, and naphthenic acids comprise an unknown number of acids and other components.

A primary object of this invention is to provide a method of producing from readily available materials soaps which conveniently gellate volatile fuels at ordinary temperatures to form incendiary gels particularly suited for military uses.

Another object is to provide soap compositions that impart to gels suited for military purposes advantageous aging characteristics of stability against breakdown and viscosity changes. Further objects will appear from the detailed description and embodiment of the invention.

Oleaginous gels have found little use in other than the lubricating grease and incendiary oil arts. Lubricating greases are generally made by forming a homogeneous suspension of soap in non-volatile and viscous lubricating oils. In forming the greases, the soaps, generally fattty acid soaps of alkaline earth metals, such as calcium, are usually made in contact with the lubricating oils with agitation at elevated temperatures. When the incorporation of the soap in the viscous oil is finished, the product is cooled at a definite rate and then milled to impart desired viscosity characteristics. The final grease product is an unctuous paste. Room-temperature gelling and aging without application of heat are unknown in this art.

Many attempts have been made heretofore to produce simple soaps of aluminum and other metals capable of forming an aged gel with volatile hydrocarbons at ordinary temperature, without any success. Aluminum soaps of commerce are not well-defined chemical substances, and even in the laboratory no one has succeeded in producing well-defined soaps with any semblance of practical reproducibility. The existence of tribasic aluminum soap has been seriously doubted. The products are believed to be mixtures of di- and mono-basic soaps and their polymers together with various amounts of free fatty acids. There has been no agreement as to the relative proportion of free fatty acids accurring in the aluminum soaps, and the function of such free fatty acids has not been understood so far. The prior art has not developed any positive generalizations that lend themselves to definite predictions of properties of the soap ingredients.

We have now found that simple aluminum soaps of commercially available saturated and unsaturated fatty acids, such as stearic and oleic acids, when coprecipitated in proper proportions and under certain well-defined conditions, provide incendiary oil gelling agents that fulfill the requirements of military incendiary gels set forth. The technique of operation, as well as the equipment for the process, is relatively simple. The raw materials are domestically available in adequate quantities.

In view of the state of prior art, it was not to be expected that the simple aluminum soap compositions made in accordance with the present invention could both gel and age volatile liquid hydrocarbon fuels at room temperatures and lower temperatures. It had been considered earlier that intimate mixtures of aluminum soaps of fatty acids could not form a gelled fuel which aged and remained stable at ordinary temperatures.

The factors and conditions found important in producing the desired soap gelling agents are the following. One important factor is the coprecipitation of aluminum soaps of the fatty acids in the presence of excess alkali. This excess alkali is based on the neutralization value of fatty acids and should be at least about 10% and not much above 50%. The preferred range is between 20 and 40% excess over the weight required to neutralize the fatty acids. A second factor is the use of an excess or major proportion of unsaturated fatty acid over the proportion of saturated fatty acid. For example, it is preferred that the proportion of oleate in the product should not be less than about 50 and not more than about 75% and that the stearate be present in an amount above 25%. Also, it has been found desirable, in using the higher proportion of unsaturated fatty acid, to incorporate a small amount of an anti-oxidant, as, for example, alpha-naphthol or the like. During the precipitation of the soaps, the temperature preferably should not be less than about 50° C., the more preferred range being about 60 to 70° C. It is also apparently advantageous to have in the precipitated product a substantial amount of alkali metal soap, e. g., in an amount of about 4% to 10%.

Various other conditions, such as the degree of agitation, the time of addition, and the amount of aqueous medium, are to be controlled in accordance with well-known chemical engineering principles.

Although the use of excess alkali should presumably produce nothing more than free aluminum hydroxide, nevertheless the coprecipitated soap has the unexpected properties of gelation and aging at ordinary temperatures.

While heretofore the description has specifically referred to coprecipitated mixtures of aluminum stearate and oleate, it is to be understood that the desired soap gelling agents may be produced from various mixed unsaturated and saturated fatty acids, but preferably from available fatty acids having from about 8 to 24 carbon atoms in the molecule. The desired soaps may be classified as high ash soaps, their ash content ranging between about 6.2 and 16%.

The improved soap compositions comprising mostly soaps of unsaturated fatty acids, i. e., generally 60% to 75% by weight thereof, exhibit a tendency to become degraded, particularly at elevated temperatures, evidently due to oxidation susceptibility. However, this is remedied advantageously by the addition of an anti-oxidant to the soap-precipitating mixture or in the process of making the soap composition. The antioxidants which may be employed for this purpose are generally typified by aromatic compounds containing oxygen or nitrogen, as in hydroxy, ether or amino groups. Some specific examples of compounds in this class are alkylated phenols, alkyl-phenyl ethers, aromatic amines, aminophenols, naphthols, quinones, and the like. Among these are compounds preferred for their low solubility in the aqueous medium with tendency to remain in the fatty acids and soaps.

For the purpose of illustration and demonstration of the invention, the following example is presented:

Example 1

Referring to the quantities in terms of parts by weight: 600 parts of oleic acid U. S. P. or commercial, containing not less than 60% oleic and not more than 20% saturated acids and 400 parts of commercial stearic acid containing no less than 45% stearic acid are suspended in 16,000 parts of soft water in a container fitted up with an agitator. The water is made alkaline by the addition of 175 parts of NaOH (20% excess) before the acids are suspended therein. Also 1 part of alpha-naphthol in a small portion of NaOH solution is added to the water solution before adding the acids. The mixture is heated to about 65° C. and the temperature maintained at this point while 1500 parts of alum solution containing 560 parts of $Al(SO_4)3.18H_2O$ (also 20% excess) are gradually added with agitation in about half an hour.

When the addition is completed, the pH of the solution falls to about 4. The agitator should be so designed that the added aluminum sulfate is agitated sufficiently to avoid high local concentration.

At the end of reaction when the agitation is stopped, the precipitated soap rises to the surface so that the subnatant clear solution may be drawn off. The soap is washed twice with the addition of water, letting it stand for a few minutes and then drawing off the subnatant liquor as before. The amount of wash water used each time should approximate the original volume, i. e., 16,000 parts.

Finally the soap is filtered in any conventional manner to draw off as much water as possible and dried at an elevated temperature until the moisture content of the soap is lower than 1% as determined by benzene distillation method. Too rapid agitation produces a fine-grained soap which is relatively slow to filter. Agitation, temperature and concentration of reactants should be adjusted as may be obvious to one skilled in the art to secure the desired results.

Other acids that are suitable to produce coprecipitated soaps of our invention are myristic, palmitic, arachidic and behenic for saturated, elaidic, linoleic, ricinoleic, linolenic, eleostearic for unsaturated.

In making the gels, the amount of soap may vary from about 7-14 per cent by weight of the oil used. The method consists in adding the soap in the required proportion to the oily material and keeping it in suspension by agitation until it has little tendency to settle. It is then stored for several hours to about 24 hours when it ages or acquires stable characteristics.

*Example 2.—Flame thrower fuel*

15 gallons of gasoline are pumped into a drum fitted up with a portable stirrer. To this about 8-8.5 lbs. of coprecipitated soap of high ash content is added in 10-30 seconds with agitation. The agitation is continued until the soap ceases to settle at the bottom when the agitator is removed and the drum closed with airtight lid for storage.

*Example 3.—Incendiary fuel*

15 gallons of gasoline are placed in a drum fitted with a portable agitator. To this 9-11 lbs. of coprecipitated soap of the invention is added with agitation to the gasoline and kept suspended with agitation until the soap ceases to settle at the bottom when the agitator is removed and the drum closed for storage. The variation in the amount of soap depends upon the viscosity required for a particular type of bomb filling.

*Example 4.—Incendiary munition*

10 grams of coprecipitated soap, made in accordance with Example 1, are placed in a nitrocellulose plastic incendiary casing; and the casing is then charged through a small opening with naphtha solvent sufficient to fill the casing except for a small void. After the casing is closed, it is shaken for about one minute and allowed to stand. The gel forms within the casing and ages therein to become stabilized without the application of heat.

In addition to the gelling agent, the incendiary gels may contain additives which thicken oil, inhibit corrosion, lower the ignition temperature, raise the heat of combustion, and elevate the combustion temperature. For example, they may contain in suspension finely divided solid carbonaceous material, such as lamp black or wood meal, ignitable metals or non-metals, oxidizing agents, and the like.

It will be realized that many substitutions and modifications may be made without departing from the scope of the invention. Accordingly, all matter described is intended to be interpreted as illustrative and not in a limiting sense.

We claim:

1. A soap-type gelling agent adapted to form with a volatile hydrocarbon fuel a military incendiary gel which ages at ordinary temperatures, comprising from 50% to 75% by weight of aluminum oleate, less than 50% but more than 25% by weight of aluminum stearate, about 1% of an oxy-aromatic anti-oxidant compound and of from 4% to 10% of a sodium oleate, sodium stearate soap consisting predominately of sodium oleate.

2. A soap-type gelling agent adapted to form a military incendiary gel, comprising from about 60% to about 75%, by weight of aluminum oleate and linoleate, from about 25% to about 40% aluminum stearate, about 1% of an anti-oxidant and from 4% to 10% of a sodium oleate, sodium stearate soap in which the sodium oleate constitutes the predominate portion.

3. The method of preparing a soap-type gelling agent adapted to form stable incendiary gels, which comprises admixing fatty acids with an aqueous alkali solution of caustic containing from about 10% to 50% excess alkali for neutralizing the acids, heating the mixture to a temperature in the range of about 50° C. to about 70° C. in the presence of an anti-oxidant, precipitating soaps from the mixture by addition of excess alum, separating resultant precipitated soaps, washing thus obtained soaps with water, and drying the washed soaps until their moisture content is lower than about 1%, said fatty acids being from about 50% to 75% oleate acid and including at least 25% stearic acid.

JOHN A. SOUTHERN.
LLOYD J. ROTH.
FRANCIS J. LICATA.
JOSEPH CUNDER.

REFERENCES CITED

The following references are of record in the file of this patent:

UNITED STATES PATENTS

| Number | Name | Date |
|---|---|---|
| 1,484,190 | Ray | Feb. 19, 1924 |
| 1,936,632 | Lederer | Nov. 28, 1933 |
| 2,127,497 | Webster | Aug. 23, 1938 |

FOREIGN PATENTS

| Number | Country | Date |
|---|---|---|
| 469,538 | France | May 23, 1914 |